US008046633B2

(12) United States Patent
Huras et al.

(10) Patent No.: US 8,046,633 B2
(45) Date of Patent: Oct. 25, 2011

(54) IMPROVING DATA AVAILABILITY DURING FAILURE DETECTION AND RECOVERY PROCESSING IN A SHARED RESOURCE SYSTEM

(75) Inventors: Matthew A. Huras, Markham (CA); Roger L. Zheng, Markham (CA); Aamer Sachedina, Markham (CA); James L. Finnie, Markham (CA); Keriley K. Romanufa, Markham (CA); Xun Xue, Markham (CA); Andrew D. Buckler, Markham (CA); Stewart L. Palmer, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 12/635,599

(22) Filed: Dec. 10, 2009

(65) Prior Publication Data

US 2011/0145627 A1    Jun. 16, 2011

(51) Int. Cl.
*G06F 11/00* (2006.01)
(52) U.S. Cl. ............................................. 714/15; 714/21
(58) Field of Classification Search .................... 714/9
See application file for complete search history.

(56) References Cited

U.S. PATENT DOCUMENTS

| 4,399,504 | A | * | 8/1983 | Obermarck et al. | 710/200 |
|---|---|---|---|---|---|
| 4,965,719 | A | * | 10/1990 | Shoens et al. | 711/100 |
| 5,226,143 | A | * | 7/1993 | Baird et al. | 711/145 |
| 5,287,473 | A | * | 2/1994 | Mohan et al. | 711/133 |
| 5,327,556 | A | * | 7/1994 | Mohan et al. | 707/695 |
| 5,333,303 | A | | 7/1994 | Mohan | |
| 5,339,427 | A | | 8/1994 | Elko et al. | |
| 5,544,345 | A | * | 8/1996 | Carpenter et al. | 711/150 |
| 5,551,046 | A | * | 8/1996 | Mohan et al. | 1/1 |
| 5,689,706 | A | * | 11/1997 | Rao et al. | 1/1 |
| 5,748,870 | A | * | 5/1998 | Tims et al. | 714/4 |
| 5,944,789 | A | * | 8/1999 | Tzelnic et al. | 709/214 |
| 6,058,416 | A | * | 5/2000 | Mukherjee et al. | 709/203 |
| 6,173,293 | B1 | * | 1/2001 | Thekkath et al. | 1/1 |
| 6,192,483 | B1 | | 2/2001 | Moiin et al. | |
| 6,195,685 | B1 | * | 2/2001 | Mukherjee et al. | 709/205 |
| 6,249,879 | B1 | * | 6/2001 | Walker et al. | 714/11 |
| 6,275,953 | B1 | * | 8/2001 | Vahalia et al. | 714/11 |
| 6,289,343 | B1 | * | 9/2001 | Freund et al. | 1/1 |
| 6,539,495 | B1 | | 3/2003 | Elko et al. | |
| 6,850,938 | B1 | * | 2/2005 | Sadjadi | 1/1 |
| 6,973,590 | B1 | * | 12/2005 | Russ et al. | 714/24 |
| 7,289,992 | B2 | * | 10/2007 | Walker | 1/1 |
| 7,299,378 | B2 | * | 11/2007 | Chandrasekaran et al. | 714/15 |
| 7,328,263 | B1 | * | 2/2008 | Sadjadi | 709/225 |
| 7,343,432 | B1 | * | 3/2008 | Niver et al. | 710/36 |
| 7,376,744 | B2 | * | 5/2008 | Loaiza et al. | 709/229 |

(Continued)

*Primary Examiner* — Scott Baderman
*Assistant Examiner* — Kamini Patel
(74) *Attorney, Agent, or Firm* — Sughrue Mion, PLLC

(57) ABSTRACT

A system and method for managing shared resources is disclosed. The system includes a primary coherency processing unit which processes lock requests from a plurality of data processing hosts, the primary coherency processing unit also storing a first current lock state information for the plurality of data processing hosts, the first current lock state information including a plurality of locks held by the plurality of data processing hosts. The system further includes a standby coherency processing unit storing fewer locks than the primary coherency processing unit, the locks stored by the standby coherency processing unit being a subset of locks included in the first current lock state information, the standby coherency unit configured to perform a plurality of activities of the primary coherency processing unit using the subset of locks in response to a failure of the primary coherency processing unit.

28 Claims, 5 Drawing Sheets

U.S. PATENT DOCUMENTS

| | | | |
|---|---|---|---|
| 7,447,786 B2* | 11/2008 | Loaiza et al. | 709/229 |
| 7,743,146 B2* | 6/2010 | Sadjadi | 709/225 |
| 2002/0016879 A1* | 2/2002 | Miller | 710/200 |
| 2003/0115518 A1 | 6/2003 | Kleveland et al. | |
| 2003/0163560 A1 | 8/2003 | Allen et al. | |
| 2007/0050377 A1* | 3/2007 | Srivastava et al. | 707/10 |
| 2010/0192072 A1* | 7/2010 | Spataro et al. | 715/753 |
| 2010/0241972 A1* | 9/2010 | Spataro et al. | 715/753 |

* cited by examiner

PCPE

| HOST1 | LOCKa | GRANT=S, WANT=X(S,X) | 300 |
| HOST2 | LOCKa | (S,S) | |
| HOST2 | LOCKb | (X,X) | |
| HOST1 | LOCKb | (0,X) | |

SCPE

| HOST2 | LOCKb | (X,X) | 301 |

IMPROVING DATA AVAILABILITY DURING FAILURE DETECTION AND RECOVERY PROCESSING IN A SHARED RESOURCE SYSTEM

BACKGROUND

1. Field of the Invention

The present disclosure relates to a robust mechanism for assuring integrity and availability of data in the event of one or more failures of nodes and/or resources of a distributed system. More particularly, it deals with lock management and page registration for resources shared in a distributed system.

2. Description of the Related Art

Distributed systems, in particular data processing systems, have long used "locking" as a means for insuring data integrity. At its most fundamental level, locking a resource is a technique used by a process to prevent its use by another process until the locking process is finished with it (the resource).

As an example of a distributed system including locking mechanisms, shared data cluster database systems allow read and write transactions to be directly executed on multiple computers in a cluster. The cluster database system provides a global locking mechanism to coordinate access to the data, and to ensure that updates are coherently performed.

In a shared data cluster database system, the global locking function may be implemented by a separate processing element in the cluster. The separate processing element is referred to as the 'primary coherency processing element' (PCPE). The PCPE runs on it's own dedicated computer, or alternatively, on the same computer as a database node. The PCPE may not run database transactions, instead it may provide a global locking function, and other functions to assist in the overall coherency of the cluster database, such as page registration services. In such systems, if a database node fails, the PCPE remains available to service new lock requests, and only locks held by the failed host are unavailable until the failed host recovers.

BRIEF SUMMARY

According to one exemplary embodiment, a system for managing shared resources includes a primary coherency processing unit which processes lock requests from a plurality of data processing hosts, the primary coherency processing unit also storing a current lock state information for the plurality of data processing hosts. The system further includes a standby coherency processing unit storing a subset of locks included in the current lock state information and configured to perform a plurality of activities of the primary coherency processing unit using the subset of locks in response to a failure of the primary coherency processing unit.

According to another exemplary embodiment, a method of managing shared resources includes processing lock requests from a plurality of data processing hosts using a primary coherency processing unit and a standby coherency processing unit. The method further includes storing a current lock state information for the plurality of data processing hosts on the primary coherency processing unit; storing a subset of locks included in the current lock state information on the standby coherency processing unit configured to perform a plurality of activities of the primary coherency processing unit using the subset of locks in response to a failure of the primary coherency processing unit. In the method, fewer locks are stored on the standby coherency processing unit compared to the primary coherency processing unit.

According to another exemplary embodiment a method of registering pages in a data management system includes registering a first plurality of pages on a primary coherency processing unit operable to coordinate activities of a plurality of data processing hosts. The method further includes selectively registering a second plurality of pages among the first plurality of pages on a standby coherency processing unit in response to a failure of the primary coherency processing unit; and at least one of purging and invalidating the first plurality of pages not selectively registered on the standby coherency processing unit. In the method the standby coherency processing unit is operable to coordinate the activities of the plurality of data processing hosts by using the selectively registered second plurality of pages in response to the failure of the primary coherency processing unit.

According to another exemplary embodiment, a computer program product for managing shared resources includes a computer readable storage medium having computer readable program code embodied therewith, the computer readable program code further including computer readable program code configured to enable a computer to perform a method. The method performed by the computer includes processing lock requests from a plurality of data processing hosts using a primary coherency processing unit and a standby coherency processing unit; storing a current lock state information for the plurality of data processing hosts on the primary coherency processing unit; and storing a subset of locks included in the current lock state information on the standby coherency processing unit configured to perform a plurality of activities of the primary coherency processing unit using the subset of locks in response to a failure of the primary coherency processing unit. Further, fewer locks are stored on the standby coherency processing unit compared to the primary coherency processing unit.

BRIEF DESCRIPTION OF THE DRAWINGS

Certain aspects of the present disclosure will become more apparent by describing in detail illustrative, non-limiting embodiments thereof with reference to the accompanying drawings, in which like reference numerals refer to like elements in the drawings.

DETAILED DESCRIPTION

Exemplary embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, or other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
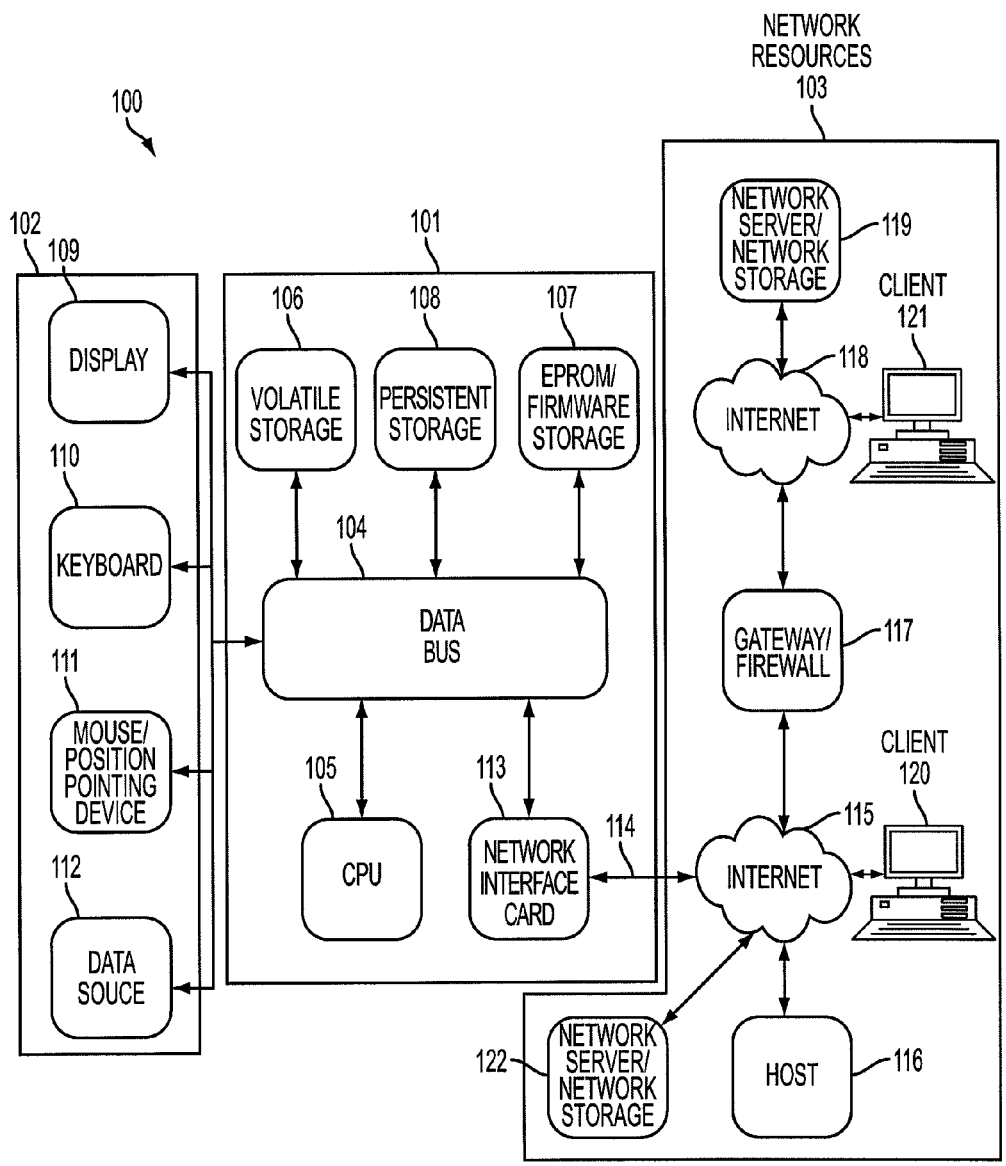
FIG. 1 is a diagram illustrating a computer system according to an exemplary embodiment.

FIG. 1 is a block diagram that illustrates an embodiment of a computer/server system 100. Exemplary embodiments of the invention disclosed herein may be applied to the exemplary computer/server system 100. The system 100 includes a computer/server platform 101, peripheral devices 102 and network resources 103. Further details concerning the computer/server system 100 will be described later.

Figure 2:
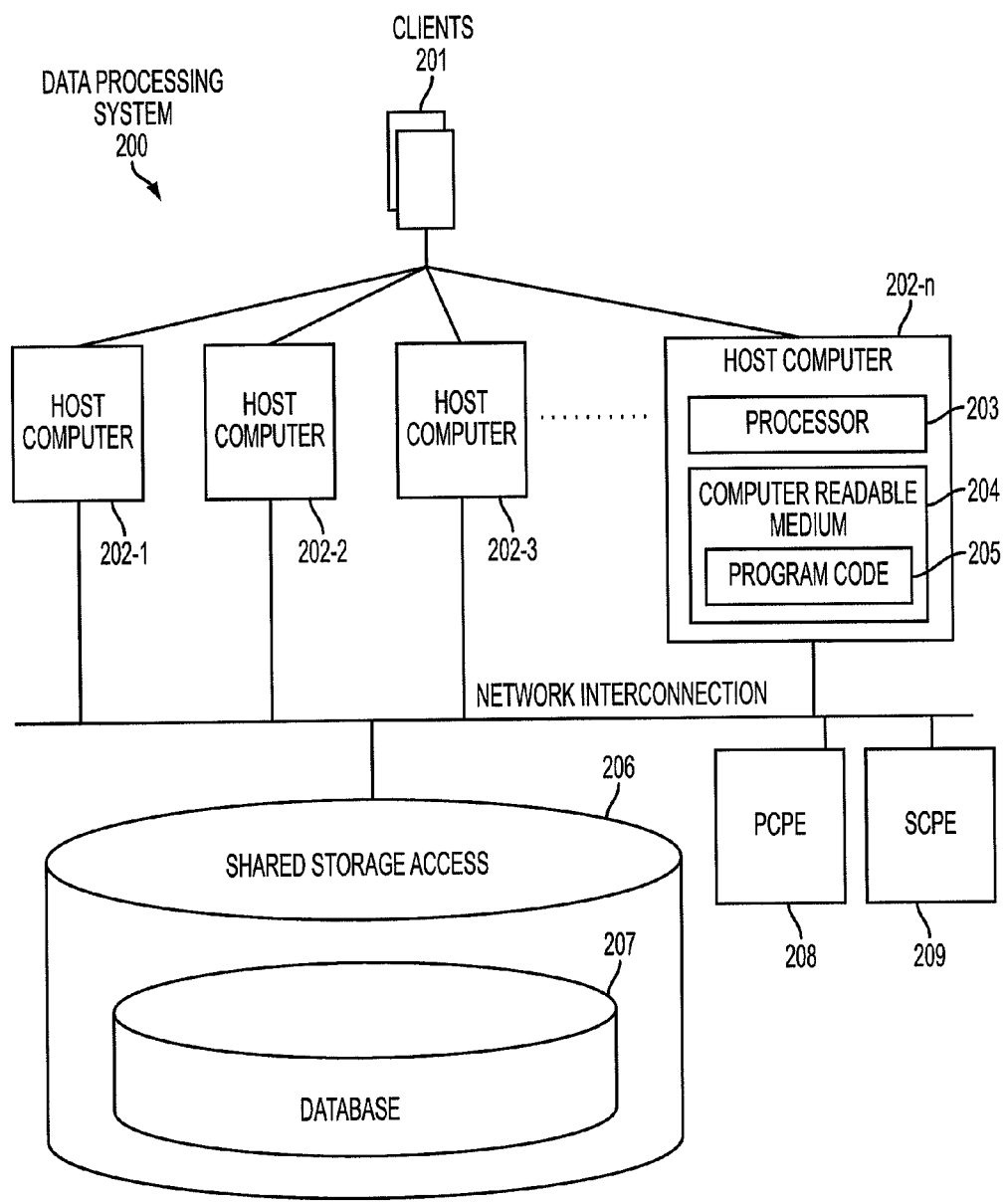
FIG. 2 is a block diagram illustrating an exemplary data processing system according to an exemplary embodiment.

FIG. 2 illustrates an example data processing system 200 according to an exemplary embodiment. The system includes a plurality of clients 201 operatively coupled to a cluster of host computers 202-1 thru 202-n. The host computers 202 co-operate with each other to provide coherent shared storage access 206 to the database 207 from any of the host computers 202. Data may be stored in the database 207 in the form of tables. Each table includes a plurality of pages, and each page includes a plurality of rows or records. The clients 201 can connect to any of the host computers 202-1 through 201-n and see a single database. A primary coherency processing unit (PCPE) 208 manages lock requests received over the network from the host computers 202. The PCPE 208 may be a single computer or may have its processing and operations spread across a plurality of processing nodes.

Each host computer 202 may be operationally coupled to a processor 203 and a computer readable medium 204. The computer readable medium 204 stores computer readable program code 205 for carrying out various operation. The processor 203 executes the program code 205 to manage the messages sent to the PCPE 208 according to the various exemplary embodiments. When data in the database 207 is being modified by a host computer 202, either through an insert, update, or delete operation, the host computer 202 may obtain a lock from the PCPE 208 for the row(s) being modified or added and for the page(s) on which the rows are found. This locking of the rows and pages bar access by other host computers during the modification or addition to avoid data concurrency problems. For example, when data in the database 207 is being queried by a host computer 202, for example through a select operation, the host computer 202 may obtain a non-exclusive read lock from the PCPE 208 for the row(s) being queried and for the page(s) in which the rows are found. This non-exclusive lock allows multiple host computers concurrent read-only access to data, while preventing other host computers from obtaining exclusive locks (required to update or modify those rows) until after the non-exclusive read locks are released.

A potential disadvantage of a system with only the PCPE is that if the PCPE fails, the global lock state must be reconstructed from the information present in the host computers 202, in another, 'standby' coherency processing element (SCPE) running on a different computer, before normal data access can continue. This reconstruction may significantly impact data availability, as perceived by surviving database nodes. Further, if the PCPE is running on the same computing host as one of the host computers, if that host computer fails, a complete reconstruction of the global lock state may not be possible, and a much larger outage may ensue. To protect against this problem, conventionally there is an option to duplex the lock state in real-time to the SCPE 209. This allows the SCPE to take over as PCPE very quickly, without reconstructing the lock information, if the existing PCPE fails. However, duplexing all the lock state information may have a high performance overhead.

According to an exemplary embodiment, the impact of lock duplexing may be minimized, by significantly reducing the amount of information that is duplexed. For example, locks obtained by queries for the purposes of maintaining the isolation semantics of those queries, need not be duplexed. This is because the PCPE either runs on it's own dedicated computer, or on the same computer as host computer 202 (for example the PCPE runs on 202-1). If the PCPE is sharing its computing host with a host computer 202-1, if that computer fails, both the host computer 202-1 and the PCPE will fail. This means that all database transactions running on the host computer 202-1 that failed will be terminated and may be re-initiated on another host computer 202 running on a different computer by the end-user application, at a later time.

Therefore, locks that protect against phenomenon such as phantom rows, and non-repeatable result sets, need not be preserved as they'll be re-acquired naturally, when the transactions are re-initiated. However, locks that may need to be maintained are those necessary to protect against access to the data that was being updated by in-flight transactions running on that computing node when it failed. Holding such locks ensures that other transactions running on surviving host computers, that may not be tolerant of reading uncommitted data, will be prevented from reading such data, throughout node failure processing and recovery. This means that when the SCPE becomes the new PCPE, the only locks it may need to retain for failed host computers are those acquired solely for the purpose of write or update access (write locks). Other locks (typically read locks) from the PCPE need not be maintained (and therefore need not be duplexed). Since read locks represent a subset of all lock requests, this technique may result in a significant run-time performance improvement. Therefore, the SCPE may store only a subset of all lock requests that are included in the current lock state information stored on the PCPE.

Finally, it is important to note that surviving host computers may require their read lock information to be reconstructed on the SCPE before it becomes the new PCPE. To accomplish this, each database node may send their read lock information to the SCPE before it becomes the primary. Restricting reconstruction to only read locks in this way reduces the time required for the SCPE to take over as the new PCPE. Furthermore, the SCPE may start servicing certain lock requests before it has received all lock reconstruction information. In particular, since the SCPE already has the write/update locks (due to duplexing), in general, new read lock requests that do not already conflict with the information maintained at the SCPE, may be granted before reconstruction completes.

Figures 3, 4:
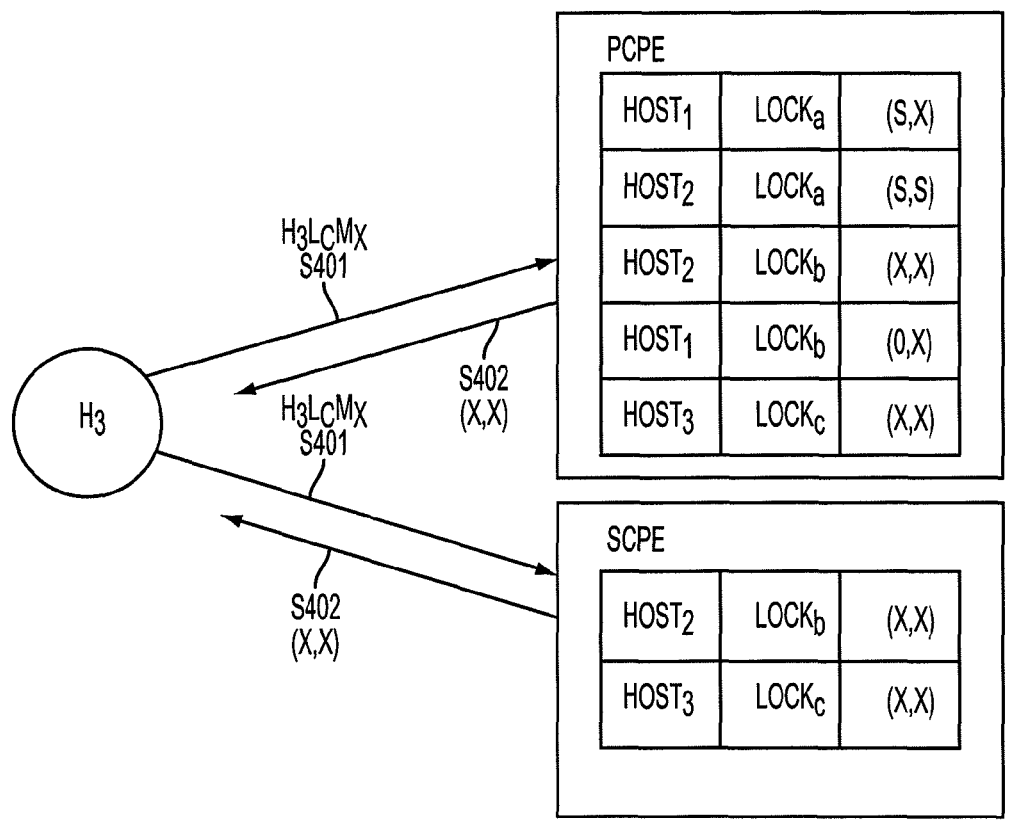
FIG. 3 is a diagram illustrating an exemplary lock state table for the PCPE and the SCPE.
FIG. 4 is a diagram illustrating a parallel duplexing technique according to an exemplary embodiment.

Next, the selective duplexing of the lock state will be described in more detail with reference to FIG. 3. A sample representation for a first current lock state information 300 stored in the PCPE 208 is shown in FIG. 3. The first column is for the database processing host computer, the second column is to represent the particular lock the host computer is interested in acquiring, and the third column is to represent the mode (or type of lock) the host computer currently holds and the mode the host currently wants to acquire.

In 300, Host 1 holds Lock A in Shared (i.e. Read) mode, but wants to upgrade to exclusive (i.e. Write) mode, therefore the representation (S,X). X is not granted because it is not compatible with the Shared lock granted to Host 2. Host 2 also holds a different lock (Lock B) in exclusive mode, and Host 1 also wants that lock in exclusive mode. As an example, Host 1 may be granted Lock B in exclusive mode if Host 2 gives up Lock B due to failure or Host 2 gives up the lock voluntarily. Other rules for transferring lock ownership will be apparent to one skilled in the art.

Next, a sample representation for a second current lock state information duplexed or stored on the SCPE 209 is shown as 301. When a host computer is granted a lock by the Primary, the granted lock mode is recorded in the SCPE if it is a retained lock (non-retained locks do not need to be duplexed according to an exemplary embodiment). As an example, S locks (read locks) are non-retained, and X locks (exclusive/write/update locks) are retained. Therefore, the secondary may have a current lock state representation of 301. In 301 there are fewer states maintained by the SCPE compared to the PCPE because not all locks are retained. For example, in 300 only Host 2 has Lock B in exclusive mode. Therefore, only this lock state information needs to be duplexed on the SCPE. Locks not used to update data, or locks used to protect against phantom rows, do not need to be maintained on the SCPE, since if both the PCPE and the host fail, those locks are not needed to maintain consistency of the database, only locks required when updating data need to be maintained on the SCPE, such that in the event of PCPE and host failure, when the failing host recovers, the host still retains those locks in order to repair the integrity of the resources protected by those retained locks. Further, in the event of a host failure 202, the PCPE may immediately release all non-retained locks held by the failing host, to increase data availability on the other host computers.

Next, the exemplary embodiment will be explained in further detail with reference to FIG. 4. In FIG. 4 and the following description, a lock request is defined by HxLyMz, meaning Host x wants Lock y in Mode z [z will be either 0 (release), S (shared/read), or X (write/exclusive/update)]. Consider a new request from Host 3: H3LcMx, i.e., Host 3 wants Lock C in exclusive mode. Exemplarily, the Host 3 sends the lock request S401 H3LcMx to the PCPE and the SCPE in parallel. In the scenario shown in FIG. 4, the PCPE and SCPE do not have a conflict with granting Lock C to Host 3 because the Lock C has not been granted in any mode to any other host computer. Therefore, the PCPE and SCPE grant the lock request S402 and the lock is registered on both the PCPE and SCPE.

Sending the lock request in parallel, i.e., parallel duplexing may avoid a problem that may occur if sequential duplexing is used. In sequential duplexing, a global lock request is first sent to the PCPE, and then when the reply is received, the corresponding lock state information is sent to the SCPE, to be recorded there. Only when the sending host computer receives the acknowledgement from the SCPE, is the requesting transaction allowed to proceed. This means there is a delay of approximately twice the total of the communication round-trip time, and lock servicing time. In contrast, the parallel duplexing technique described with reference to FIG. 4, sends the lock request information to both PCPE and SCPE, in parallel. Sending the lock request information in parallel may be equivalent to sending the requests at the same time. However, it may also be true that the requests to the PCPE and SCPE are sent with some delay in between. This may effectively reduce the latency for the lock request operation by a factor of two. Only after the acknowledgement from both the SCPE and the PCPE are collected, is the requesting transaction allowed to proceed. Further, exemplarily a host computer may only send a read lock request to the PCPE and not send the read lock request to the SCPE, i.e., the host computer may send a non-retained lock request only to the PCPE and not to the SCPE. An exemplary scenario where a host computer wants to downgrade its lock state is described next. Suppose that H1 has Lock A in X mode on both PCPE and SCPE. Now, H1 wants to transition from X to S mode. In this case, H1 ends up downgrading on the PCPE, and releasing on the SCPE, with both requests being sent in parallel (i.e. H1LaMs is sent to the PCPE, H1LaM0 is sent to the SCPE). This ensures that the SCPE always maintains only the retained/write lock information, regardless of the order that locks are acquired, upgraded, downgraded, etc.

However, the parallel duplexing technique may introduce some complexities. Next, some of the exemplary complex scenarios and exemplary techniques of operation in these complex scenarios is described. Referring to FIG. 4, consider the case that Host 3 wants La (Lock A) in exclusive mode. This conflicts with the PCPE, which will respond with (0,X). However, this lock is not currently recorded by any hosts on the SCPE, so the SCPE will respond with (X), i.e., lock granted in exclusive mode. This leads to an incorrect situation and Host 3 determines the conflict based on the responses from the SCPE and the PCPE. To resolve this incorrect situation, Host 3 may transmit a compensation request to the SCPE to release the lock, i.e. the following request may be sent: H3LaM0. This informs the SCPE to release the lock (i.e. a compensation request may be represented by a normal lock release, sent only to the SCPE).

In the previous example, an incorrect duplexing prediction results in extra requests/network traffic/etc to the SCPE. An exemplary embodiment may further include intelligent predictive duplexing to reduce the cost of incorrect predictions, while maintaining the majority of the benefits for correct predictions. Intelligent predictive duplexing may be defined as the ability to apply parallel duplexing selectively, i.e., the host computer sends the lock request in parallel based on some intelligence to decrease the probability of an incorrect situation wherein the PCPE and SCPE have different state stored for the lock requested. Intelligent predictive duplexing may include one or more of the following strategies:

(a) future predictions of the lock state may be based on the result of past predictions (i.e. were previous predictions for this lock correct or incorrect).

(b) predictions of the lock state may also be based on apriori knowledge of specific locks (for instance, certain locks may be frequently held in a non-retained/shared mode, so predictions of X sent to the SCPE will often be incorrect and require compensation requests)

(c) predictions of the lock state may also be based on other criteria in the system.

Figure 5:
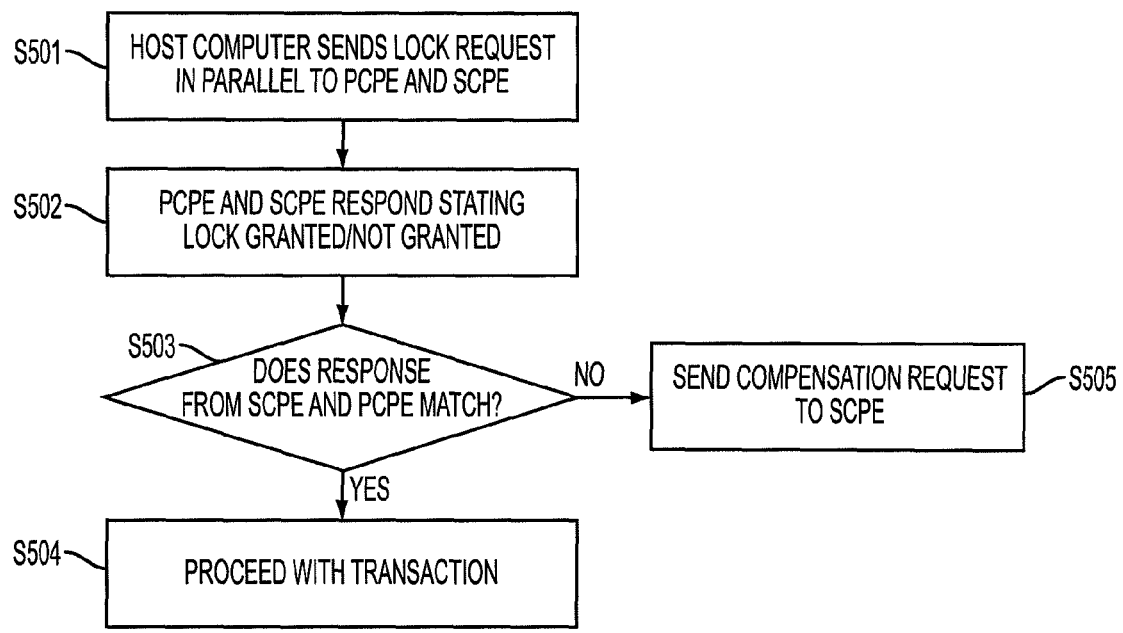
FIG. 5 is a flow chart illustrative of a method for ensuring consistency in a data processing system by transmitting compensation requests.

FIG. 5 is an exemplary illustration of the parallel duplexing technique and a method of conflict resolution. In S501, a host computer 202 sends lock request to the PCPE and the SCPE in parallel. In S502, the PCPE and SCPE check their individual lock state information for a conflict. Depending on whether they have a conflict, both SCPE and the PCPE send a response to the host computer stating lock granted/lock denied. In S503, the host computer checks to see if there is a conflict between the responses it received from the PCPE and the SCPE. If there is no conflict, the host computer proceeds with the transaction for which it request the lock in S504. If it determines that there is a conflict, it transmits a compensation request to the SCPE in S505. The compensation request may be for example a lock release request if the SCPE granted a lock and the PCPE denied the same lock to the host computer.

Further complexities may arise when one or a combination of PCPE, SCPE, and a host computer fails. Next, some exemplary scenarios relating to failure and recovery are described. Solutions for maintaining coherency and consistency in these exemplary scenarios are also described.

SCPE Failure, or Host+SCPE Failure

Nothing further may be needed, the incorrect state was only ever recorded on the SCPE, so if the SCPE fails, no state correction is required.

PCPE Failure

SCPE becomes the new PCPE, SCPE now has an extra incorrect lock state recorded (i.e. H3LaMx from an earlier example). This incorrect lock state must be resolved before the SCPE can become the PCPE, as some other host may be holding La in a conflicting mode (both H1 and H2 hold the lock in S mode in our example referring to FIG. 4).

Therefore, H3 must send the compensation state (H3LaM0) to release the lock on the SCPE before it can take over from the PCPE (i.e. accept all the non-retained locks sent by all the other hosts).

Each host can start transmitting all non-retained locks to the SCPE, and we can consider the compensation state (H3LaM0) as one of those non-retained states that needs to be transmitted. By the time the SCPE is ready to perform "conflict resolution", the conflicting mode due to the incorrect prediction has already been resolved.

Host Failure

Consider the case that a host fails before transmitting a compensation request and an incorrect lock state was registered on the SCPE. When the host recovers, it has to release extra (incorrect) lock state recorded on SCPE. According to an exemplary embodiment, another host computer may read in all retained locks from PCPE, then read in all locks from SCPE, and for any locks from SCPE that are not also found on PCPE, a compensation (i.e. H3LaM0) can be sent to SCPE before host failure recovery begins (host failure recovery, also called crash recovery, is a concept known in the art). Exemplarily, the host may first recover and may perform the "host lock reconciliation" described above by itself.

Alternatively, prior to host failure recovery a "force" request may be issued from another host. For instance, if H1 was later granted La in Mx from the PCPE and La was granted to the failed host H3 by the SCPE, H1 may pass a special option/flag/identifier to the SCPE telling it that H1 is guaranteed to contain the most accurate state for this lock, and the SCPE should grant this request even if it conflicts with any other entries in it's lock table. This lock may then, for example, be put into a special state (i.e. "conflict resolution pending") until the compensation arrives from the failed host during host recovery. Another possible action for the SCPE here is to always "trust" live hosts, such that the mode the SCPE had previously recorded for the failed host would be downgraded to a mode that does not conflict with any live hosts. For example, here the lock may be released (i.e. M0) for the failed host H3.

Host+PCPE Failure:

In this exemplary scenario, the SCPE already contains the retained locks (for example write locks) duplexed by all the live hosts, as well as the locks including incorrectly predicted locks from the failed host. The SCPE must take over PCPE duties, but must first be told of all non-retained locks granted by the old/failed PCPE. Each live host may then record all granted non-retained locks (for example read locks) on the SCPE, however some of these non-retained locks may conflict with locks requiring compensation from the failed host.

An exemplary solution may be to "trust live hosts". Each host will transmit all non-retained locks granted by the previous PCPE, passing in a "force" flag/option. After all live hosts have transmitted all non-retained locks, the SCPE may be placed into a "conflict resolution pending" phase prior to becoming the new PCPE, where it may scan all locks in it's table, and for any locks found to be granted in conflicting modes between live members and failed members, the SCPE may downgrade the mode granted to the failed member to one that does not conflict with any live members. Once this resolution has been performed, the SCPE can then become the new PCPE and start granting locks, even prior to the failed host performing it's failure recovery processing.

Next, exemplary complex scenarios that further explain the "force" option and the "trust live hosts" option are described.

Scenario 1

PCPE

| $H_3$ | $L_a$ | (X, X) |
|---|---|---|
| $H_2$ | $L_a$ | (0, S) |

SCPE

| $H_3$ | $L_a$ | (X, X) |
|---|---|---|

Consider the above state of the PCPE and the SCPE. Now, $H_3$ wants to release the Lock A, and wants to release it from both PCPE and SCPE. For this, the following request is sent to both PCPE and SCPE in parallel—$H_3L_aM_0$. Consider that if this release only makes it to the PCPE, such that the PCPE processes the release and grants the S lock to $H_2$. Before the release to the SCPE completes, $H_3$ crashes/fails. At this point, the PCPE and SCPE now have the following conflicting views of the lock:

PCPE

| $H_2$ | $L_a$ | (S, S) |
|---|---|---|

SCPE

| $H_3$ | $L_a$ | (X, X) |
|---|---|---|

If $H_3$ were to come back online now and perform recovery, it would end up releasing the lock on the SCPE, since it does not find that same lock on the PCPE any more. If, however, the PCPE fails at this point, then $H_2$ believes it has the lock in S mode, so as part of SCPE failover (SCPE becoming the new PCPE), $H_2$ tells the SCPE that it holds the lock in S mode. Normally, this request would be rejected since it conflicts with the SCPE's view that $H_3$ still holds the lock in X mode. During this failover, however, the "force" flag/option may be specified when $H_2$ notifies the SCPE (soon to be PCPE) that it holds $L_a$ in S mode. After all live hosts have recorded all their non-retained (shared/read) locks, the SCPE then performs the "trust live hosts" operation, and due to the conflict on $H_3$ for $L_a$, determines that it must trust $H_2$ instead (the live host), and lowers $H_3$'s interest in the lock to a compatible mode—for example, S mode (read/shared mode).

Scenario 2

Consider now a very similar scenario involving incorrect predictions. Consider if $H_2$ was initially granted $L_a$ in S mode, at the time that $H_3$ predicts that it can acquire $L_a$ in X mode. The request $H_3L_aM_x$ is then sent to both PCPE and SCPE in parallel, and the new state of the system after $H_3$ receives the initial set of responses is:

PCPE

| | | |
|---|---|---|
| $H_3$ | $L_a$ | (0, X) |
| $H_2$ | $L_a$ | (S, S) |

SCPE

| | | |
|---|---|---|
| $H_3$ | $L_a$ | (X, X) |

If $H_3$ were to fail at this point, the PCPE would discard/cancel the dead host's request, but the SCPE still believes the X lock is granted to $H_3$, since it never received the compensation request ($H_3$ failed before sending it). If the PCPE fails now, we have the same scenario—a conflict between the S mode granted to $H_2$ by the old PCPE, and the X mode that the SCPE incorrectly thinks is granted to $H_3$. The solution is the same as the last example, during SCPE failover to become the new PCPE, $H_2$ records the S with the force option, and at the end, the SCPE "trusts live hosts" and downgrades $H_3$'s mode to be compatible with $H_2$.

Scenario 3

Consider another scenario similar to the first, where there are no failed hosts, there are just some incorrect lock predictions and for which the corresponding host computers have not issued compensation requests at the time the PCPE fails. Consider the following state right before the PCPE failure:

PCPE

| | | |
|---|---|---|
| $H_1$ | $L_a$ | (S, S) |
| $H_3$ | $L_a$ | (0, X) |
| $H_2$ | $L_b$ | (S, S) |
| $H_1$ | $L_b$ | (0, X) |
| $H_3$ | $L_c$ | (S, S) |
| $H_2$ | $L_c$ | (0, X) |

SCPE

| | | |
|---|---|---|
| $H_1$ | $L_b$ | (X, X) |
| $H_2$ | $L_c$ | (X, X) |
| $H_3$ | $L_a$ | (X, X) |

Note that in the SCPE table above, each of those entries reflect incorrect predictions (locks could not be granted by the PCPE due to conflicts). Consider now that the compensation requests to the SCPE (i.e. the compensation request for above locks that were granted by the SCPE even though there were conflicts on the PCPE) are delayed for some reason (due to network latency issues, timing, etc). Without using the "force" option, then the SCPE would reject each of the S requests during failover (takeover activities of the PCPE by the SCPE):

$H_1L_aM_s$
$H_2L_bM_s$
$H_3L_cM_s$

So, by using the "force" option even when all hosts are up the failover time (time it takes for SCPE to resume duties as the PCPE) is reduced—the SCPE would accept all the initially-conflicting requests. During failover, the compensation requests can be sent (with or without the "force" option) at the same time that the non-retained/read locks (containing the "force" option) are recorded on the SCPE. As the compensation requests are received by the SCPE, the lock conflicts will be resolved. This may reduce failover time as it reduces the amount of communication needed—i.e. if we instead retried each conflicting request, there would be much more traffic during failover, since they would continue to fail until the compensation requests end up making their way to the SCPE. Note that if some hosts failed before sending the compensation requests, then the "trust live hosts" logic would resolve the conflicts when the SCPE fully takes over as the new PCPE.

According to another exemplary embodiment, page registration is selectively reconstructed post PCPE failure. Conventionally, page registration information is used by the PCPE to keep track of all the pages each data processing host has buffered. This is needed to ensure that when a transaction commits updates to a page, any copies of the page in other database nodes can be invalidated, so those other nodes will request new, up-to-date, copies of the pages, the next time they are referenced. However, if the PCPE fails, this registration information is lost, and normal update activity cannot continue until either the page registration information is completely reconstructed on the SCPE, or all buffered pages in all data processing hosts are effectively purged. Either choice may lead to significant loss of availability and/or performance degradation. Real-time duplexing of the page registration information is possible, but may significantly impact performance. Therefore, it may be beneficial for the data processing hosts to selectively register pages with the SCPE during failover.

Next, a detailed description of the selective page registration is described. Consider the following exemplary tables stored in the PCPE and SCPE. In the page tables shown below, the last column refers to whether the page is registered ($R_2$) or not ($R_1$). Un-registered pages are stored on either the PCPE, SCPE, or PCPE+SCPE. If there are unregistered pages on the PCPE, no other host should have a copy of that page. If there are un-registered pages on the SCPE, other hosts may store copies of those pages for as long as they have those pages registered on the PCPE. As soon as the PCPE fails, the PCPE registrations are lost, so each host must either re-register any pages they need with the SCPE, or purge those pages. An un-registered page still contains the latest copy of page data for faster access to that page by hosts, i.e., a Host can read and register that page from the SCPE rather than having to read that page in from disk before registering with the SCPE.

PCPE

| | | |
|---|---|---|
| $H_1$ | $Page_a$ | $R_2$ |
| $H_2$ | $Page_a$ | $R_2$ |
| $H_1$ | $Page_b$ | $R_2$ |
| $H_1$ | $Page_c$ | $R_2$ |
| $H_2$ | $Page_c$ | $R_2$ |
| $H_2$ | $Page_d$ | $R_2$ |

The SCPE must maintain copies of pages stored in the PCPE, but will not maintain page registrations, so will not maintain any host information. As such, the SCPE page table may be represented as:

SCPE

| | |
|---|---|
| $Page_a$ | $R_1$ |
| $Page_b$ | $R_1$ |
| $Page_c$ | $R_1$ |
| $Page_d$ | $R_1$ |

For any registered page on the PCPE, the Host maintains similar information, as an example, $H_1$ will maintain the following page table:

| | | |
|---|---|---|
| $H_1$ | $Page_a$ | $R_2$ |
| $H_1$ | $Page_b$ | $R_2$ |
| $H_1$ | $Page_c$ | $R_2$ |

If a particular Host has a page registered with the PCPE, then that host knows that its cached page data is valid, until such time the host explicitly invalidates or purges its copy of the page (at which point the Host may unregister that page with the PCPE), or the PCPE may inform the Host that its copy of the page is no longer valid (at which time the Host may purge/invalidate its local copy of the page).

In the event of PCPE failure, the SCPE becomes the new PCPE, but the SCPE currently does not have any page registration data, so has no knowledge of what copies of pages may be stored on each Host. Selective registration of the pages is then performed, i.e., each Host (202) independently determines which pages they are caching locally that are still valid (were registered on the PCPE prior to PCPE failure) and are locally "hot" or important, and so should be registered on the SCPE during failover.

The hotness/importance of a page may be determined by a plurality of methods such as the conventional clock-hand algorithm, or by maintaining a strict MRU list (most-recently used).

Conventional techniques of maintaining a strict MRU order of hotness, or any other strict hotness ordering, is very expensive, so most "hotness" techniques end up giving individual hotness ranks/importance values. For instance, if the system has apriori knowledge that a particular page will almost definitely be referenced in the near future, it may be considered to have the "hottest" setting (high value) or maximum importance (highest importance value). Over time, this hotness value/importance value may decrease. For example, for clock hand algorithms, at each clock iteration, the hotness value may be decremented by some value, for example, the hotness value may be decremented by 1. Alternatively, if a strict MRU list is implemented, the head of the MRU list may be assigned the "hottest" setting or value, while the tail of the MRU may have the "coldest" setting or value.

According to an exemplary embodiment, all pages above a certain threshold may be required to re-register on the SCPE in the event of failover. This threshold may be determined by any (or all) of the following methods (or by any other obvious extension of these methods):

1) Re-register a fixed portion of the total list of pages stored on each host. For instance, starting from the hottest page (most important page), and proceeding to cooler pages (least important page), re-register pages until some percentage of the total local pages have been re-registered. The percentage may be 10% for example.
2) Re-register any pages that have a "hotness" setting that exceeds some pre-determined threshold. For example, if each individual page is assigned a hotness rating (importance rating) from 0-100 with 100 being the hottest, a host computer may want to re-register any pages with a hotness setting (importance value) of 90 or higher. It should be noted that this does not translate into only registering the 10% hottest pages, as an example, one host may have a very disproportionate ratio of hot pages and may end up re-registering many more pages than another host that has much fewer hot pages.
3) Failover time requirements. Starting from the hottest pages, a host may re-register pages until a certain elapsed time has expired.

Consider the example page tables above, and from the hotness re-registration selection criteria, $H_1$ determines that it needs to re-register $Page_a$ and $Page_c$, whereas $H_2$ determines that it only needs to re-register $Page_a$. Therefore, the following re-registration requests may be transmitted to the SCPE during failover:

$H_1P_aR_2$
$H_1P_cR_2$
$H_2P_aR_2$

After these re-registrations have been performed, the page table stored at the SCPE can now be represented as:

| | | |
|---|---|---|
| $H_1$ | $Page_a$ | $R_2$ |
| $H_2$ | $Page_a$ | $R_2$ |
| | $Page_b$ | $R_1$ |
| $H_1$ | $Page_c$ | $R_2$ |
| | $Page_d$ | $R_1$ |

At this point, any remaining un-registered pages on the SCPE are still valid, so may be maintained in the SCPE page cache. As soon as each Host has re-registered its desired pages, the SCPE can failover to become the new PCPE. However, each Host must locally invalidate/purge any locally cached pages that have not been re-registered, since that Host will no longer be notified by the new PCPE if another host later invalidates that page. For example, $H_1$ may now represent its local page table as:

| | | |
|---|---|---|
| $H_1$ | $Page_a$ | $R_2$ |
| $H_1$ | $Page_b$ | $R_1$ |
| $H_1$ | $Page_c$ | $R_2$ |

The table above shows that $H_1$ is maintaining an unregistered/invalidated local copy of $Page_b$, which means that $Page_b$ contains data that is no longer guaranteed to be valid/accurate. Alternatively, $H_1$ may explicitly purge its local copy of $Page_b$, in which case its local page table may be represented as:

| | | |
|---|---|---|
| $H_1$ | $Page_a$ | $R_2$ |
| $H_1$ | $Page_c$ | $R_2$ |

Figure 6:
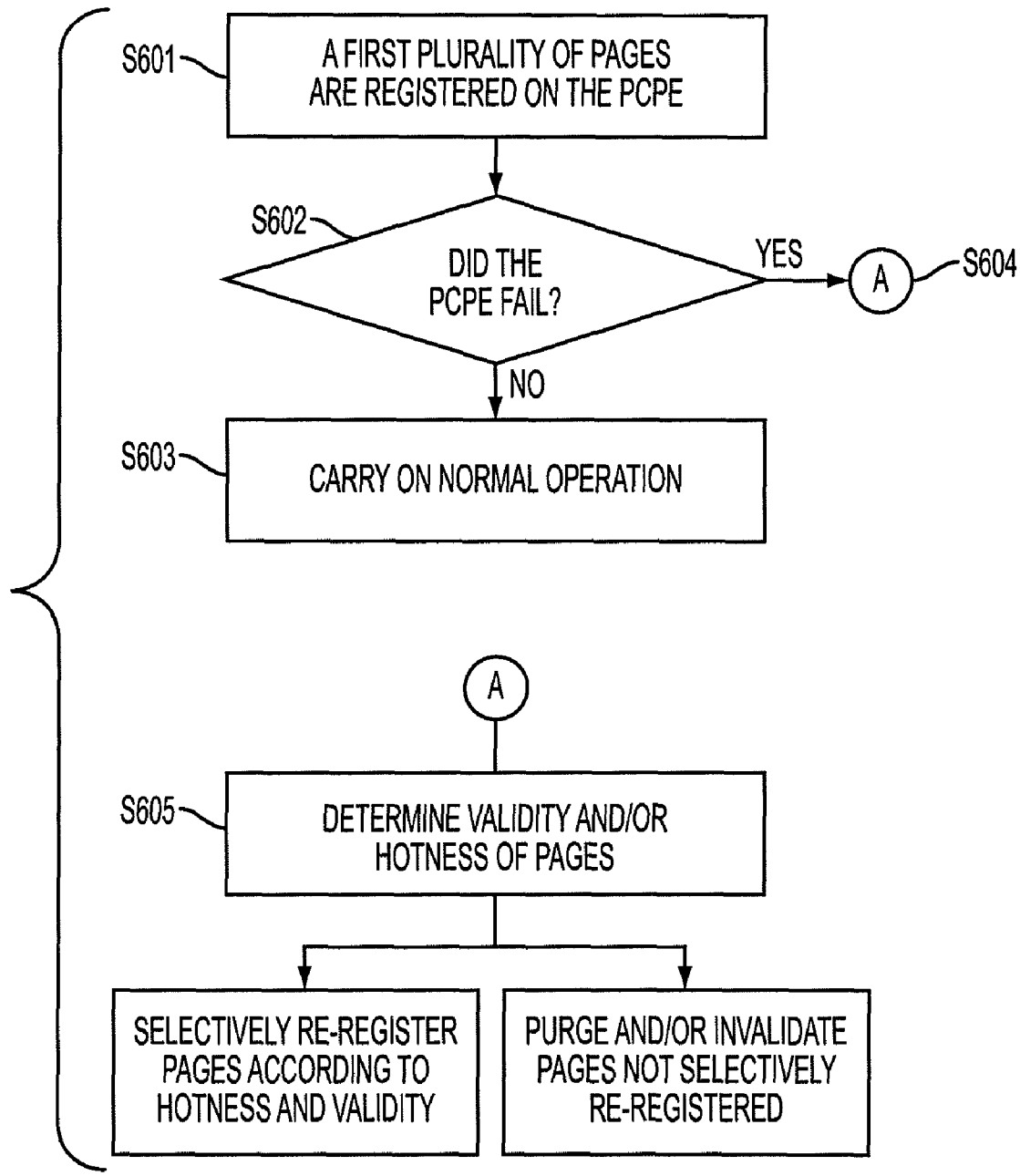
FIG. 6 is a flow chart illustrative of a selective page registration scheme.

The exemplary selective page registration is further illustrated with reference to FIG. 6. In S601, a first plurality of pages are registered on the PCPE. In S602, it is checked whether the PCPE failed. If the PCPE did not fail, normal operation continues in S603. If the PCPE failure is detected, the data processing hosts begin the process of determining validity and/or hotness of the first plurality of pages stored locally. Based on the hotness and/or validity of the first plurality of pages, a subset of the first plurality of pages are selected and registered on the SCPE. The remaining pages not selectively registered are either purged and/or invalidated.

The exemplary selective page registration technique disclosed here may avoid certain problems that are likely to occur if:

a) The hosts purge all their local pages: Here, there may be a high runtime cost to re-transmit the page data from the new PCPE (when SCPE fails over to become new PCPE) in the near future.

b) The hosts register all pages in the SCPE: Here, since there are likely many pages cached locally that have not been referenced in a long time, and will not likely be referenced in the near future, re-registering all locally cached pages would increase the time needed to perform failover, meaning the cluster may be unavailable for processing new requests for a longer time, which may not be desirable.

An exemplary embodiment may operate as a combination of the various exemplary embodiments discussed above. For example, an exemplary embodiment may perform both selective lock duplexing and selective page registration. Accordingly, during runtime, not all data is fully duplexed on both PCPE and SCPE, i.e., non-retained locks are not duplexed on the SCPE, and page registrations are not duplexed on the SCPE. This may lead to improvements in runtime performance. However, enough data may be duplexed to both PCPE and SCPE such that in the event of tolerable failures in the system (Host(s), PCPE, SCPE, PCPE+Host(s), SCPE+Host(s)), the cluster as a whole can continue processing. In particular, in the event of PCPE (or PCPE+Host(s)) failure, enough data is already stored on the SCPE to prevent cluster failure (SCPE can take over from PCPE even when some Hosts fail at the same time), and failover time (time for SCPE to become PCPE) is minimized.

As discussed above, FIG. 1 is a block diagram that illustrates a computer/server system 100 according to an exemplary embodiment. Exemplary embodiments disclosed herein may be applied to the exemplary computer/server system 100. The system 100 includes a computer/server platform 101, peripheral devices 102 and network resources 103.

The computer platform 101 may include a data bus 104 or other communication mechanism for communicating information across and among various parts of the computer platform 101, and a processor 105 coupled with bus 101 for processing information and performing other computational and control tasks. Computer platform 101 also includes a volatile storage 106, such as a random access memory (RAM) or other dynamic storage device, coupled to bus 104 for storing various information as well as instructions to be executed by processor 105. The volatile storage 106 also may be used for storing temporary variables or other intermediate information during execution of instructions by processor 105.

Computer platform 101 may further include a read only memory (ROM or EPROM) 107 or other static storage device coupled to bus 104 for storing static information and instructions for processor 105, such as basic input-output system (BIOS), as well as various system configuration parameters. A persistent storage device 108, such as a magnetic disk, optical disk, or solid-state flash memory device is provided and coupled to bus 101 for storing information and instructions. For example, the persistent storage device 108 may store one or more security lists and may also include cache that stores metadata members.

Computer platform 101 may be coupled via bus 104 to a display 109, such as a cathode ray tube (CRT), plasma display, or a liquid crystal display (LCD), for displaying information to a user of the computer platform 101. An input device 120, including alphanumeric and other keys, is coupled to bus 101 for communicating information and command selections to processor 105. Another type of user input device is cursor control device 111, such as a mouse, a trackball, or cursor direction keys for communicating direction information and command selections to a processor 104 and for controlling cursor movement on display 109. This input device typically has two degrees of freedom in two axes, a first axis (e.g., x) and a second axis (e.g., y), that allows the device to specify positions in a plane.

An external storage device (a data source) 112 may be connected to the computer platform 101 via bus 104 used by the computer platform 101. Although only one data source 112 is depicted for purposes of simplicity, a number of data sources 112 may be present as well as other types of data sources. The data source 112 may be a database storing various tables.

The term "computer-readable medium" as used herein refers to any medium that participates in providing instructions to processor 105 for execution. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable storage medium may be any tangible medium that can contain, or store a program for use by or in connection with an instruction execution system. apparatus, or device.

A computer readable signal medium may include a propagated data signal with computer readable program code embodied therein, for example, in base band or as part of a carrier wave. Such a propagated signal may take any of a variety of forms, including, but not limited to, the electromagnetic, optical, or any suitable combination thereof. The computer readable signal medium may include coaxial cables, copper wire and fiber optics, including the wires that comprise data bus 104. The computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the exemplary embodiments may be written in any combination of one or more programming languages, including an object oriented programming language such as Java, Smalltalk, C++, .Net or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 108. Volatile media includes dynamic memory, such as volatile storage 106.

Various forms of computer readable media may be involved in carrying one or more sequences of one or more instructions to processor 105 for execution. For example, the instructions may initially be carried on a magnetic disk from a remote computer. Alternatively, a remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on the data bus 104. The bus 104 carries the data to the volatile storage 106, from which processor 105 retrieves and executes the instructions. The instructions received by the volatile memory 106 may optionally be stored on persistent storage device 108 either before or after execution by processor 105. The instructions may also be downloaded into the computer platform 101 via Internet using a variety of network data communication protocols well known in the art.

The computer platform 101 also includes a communication interface, such as network interface card 113 coupled to the data bus 104. Communication interface 113 provides a two-way data communication coupling to a network link 114 that is connected to a local network 115. For example, communication interface 113 may be an integrated services digital network (ISDN) card or a modem to provide a data communication connection to a corresponding type of telephone line. As another example, communication interface 113 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 113 sends and receives electrical, electromagnetic or optical signals that carry digital data streams representing various types of information.

Network link 113 typically provides data communication through one or more networks to other network resources. For example, network link 114 may provide a connection through local network 115 to a host computer 116, or a network storage/server 117. Additionally or alternatively, the network link 113 may connect through gateway/firewall 117 to the wide-area or global network 118, such as an Internet. Thus, the computer platform 101 can access network resources located anywhere on the Internet 118, such as a remote network storage/server 119, which is another example of a data source. On the other hand, the computer platform 101 may also be accessed by clients located anywhere on the local area network 115 and/or the Internet 118. The network clients 120 and 121 may access the computer platform 101 remotely.

Local network 115 and the Internet 118 both use electrical, electromagnetic or optical signals that carry digital data streams. The signals through the various networks and the signals on network link 114 and through communication interface 113, which carry the digital data to and from computer platform 101, are exemplary forms of carrier waves transporting the information.

Computer platform 101 can send messages and receive data, including program code, through the variety of network(s) including Internet 118 and LAN 115, network link 114 and communication interface 113. In the Internet example, when the system 101 acts as a network server, it might transmit a requested code or data for an application program running on client(s) 120 and/or 121 through Internet 118, gateway/firewall 117, local area network 115 and communication interface 113. Similarly, it may receive code from other network resources.

The received code may be executed by processor 105 as it is received, and/or stored in persistent or volatile storage devices 108 and 106, respectively, or other non-volatile storage for later execution. In this manner, computer system 101 may obtain application code in the form of a carrier wave.

As will be appreciated by one skilled in the art, exemplary embodiments disclosed herein may be embodied as a system, method or computer program product. Accordingly, aspects of the disclosed exemplary embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of exemplary embodiments may take the form of a computer program product embodied in one or more computer readable medium(s) having computer readable program code embodied thereon.

The flowchart and block diagrams in the figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or acts for performing the function in combination with other claimed elements as specifically claimed. The description of the exemplary embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What we claim is:

1. A system for managing shared resources, the system comprising:
   a primary coherency processing unit which processes lock requests from a plurality of data processing hosts, the primary coherency processing unit also storing a first current lock state information for the plurality of data processing hosts, the first current lock state information including a plurality of locks held by the plurality of data processing hosts; and
   a standby coherency processing unit which stores a second lock state information including a subset of the plurality of locks included in the first current lock state information, the standby coherency unit configured to perform a plurality of activities of the primary coherency processing unit using the subset of locks in response to a failure of the primary coherency processing unit,
   wherein:
   the second lock state information includes fewer locks than the first current lock state information, and
   at least one of the primary coherency processing unit and the standby coherency processing unit is implemented on a processor.

2. The system of claim 1, wherein the primary coherency processing unit and the standby coherency processing unit receive the lock requests from the plurality of data processing hosts in parallel.

3. The system of claim 2, further comprising a first data processing host from among the plurality of data processing hosts, wherein in response to a first lock request for a first lock, the first lock request being issued by the first data processing host, the primary coherency processing unit and the standby coherency processing unit each transmit a response to the first data processing host based on the lock state information stored in the primary coherency processing unit and the standby coherency processing unit, respectively, each of the responses including one of a first lock grant and first lock denial.

4. The system of claim 3, wherein the first data processing host receives the responses transmitted from the primary coherency processing unit and the standby coherency processing unit and compares the received responses to determine whether the received responses conflict.

5. The system of claim 4, wherein the first data processing host transmits a compensation request to the standby coherency processing unit in response to a determination of a conflict between the responses received from the primary coherency processing unit and secondary coherency processing unit.

6. The system of claim 5, wherein the compensation request is a lock release request for releasing the first lock and the standby coherency processing unit releases the first lock in response to the compensation lock request.

7. The system of claim 3, wherein during failover the standby coherency processing unit grants the first lock request, in response to the first lock request issued by the first data processing host being a conflict with a lock state of a second data processing host, the lock state of the second data processing host stored on the standby coherency processing unit.

8. The system of claim 7, wherein the standby coherency processing unit downgrades a mode of the lock state of the second data processing host in response to the second data processing host being a failed host.

9. The system of claim 1, wherein the subset of locks stored in the standby coherency processing unit includes a write lock and does not include a read lock.

10. The system of claim 1, wherein the first current lock state information and the second lock state information further include:
    an identity of the data processing hosts corresponding to the locks stored therein, and
    a lock type for each of the locks stored therein.

11. A method of registering pages in a data management system, the method comprising:
    registering a first plurality of pages on a primary coherency processing unit operable to coordinate activities of a plurality of data processing hosts;
    selectively registering a second plurality of pages among the first plurality of pages on a standby coherency processing unit in response to a failure of the primary coherency processing unit; and
    at least one of purging and invalidating the first plurality of pages not selectively registered on the standby coherency processing unit,
    wherein the standby coherency processing unit is operable to coordinate the activities of the plurality of data processing hosts by using the selectively registered second plurality of pages in response to the failure of the primary coherency processing unit.

12. The method of claim 11, wherein the selectively registering comprises determining at least one of validity and importance of the second plurality of pages.

13. The method of claim 12, wherein the second plurality of pages are selectively registered on the standby coherency processing unit in response to the determination that an importance value of the second plurality of pages is greater than a predetermined threshold.

14. A method of managing shared resources, the method comprising:

processing lock requests from a plurality of data processing hosts using a primary coherency processing unit and a standby coherency processing unit;

storing a first current lock state information for the plurality of data processing hosts on the primary coherency processing unit;

storing a second lock state information on the standby coherency processing unit, the second lock state information including a subset of locks included in the first current lock state information, the standby coherency processing unit configured to perform a plurality of activities of the primary coherency processing unit using the subset of locks in response to a failure of the primary coherency processing unit, wherein fewer locks are included in the second lock state information compared to the first lock state information.

15. The method of claim 14, wherein the primary coherency processing unit and the standby coherency processing unit receive the lock requests for processing from the plurality of data processing hosts in parallel.

16. The method of claim 15, further comprising transmitting a first and a second response to a first data processing host among the plurality of data processing hosts, the transmitting in response to a first lock request issued by the first data processing host for a first lock, wherein the first and second responses include one of a first lock grant and first lock denial, and are transmitted by the primary coherency processing unit and the standby coherency processing unit, respectively.

17. The method of claim 16, further comprising receiving at the first data processing host the responses transmitted from the primary coherency processing unit and the standby coherency processing unit, and comparing the received responses at the first data processing host to determine whether the received responses conflict.

18. The method of claim 17, wherein the first data processing host transmits a compensation lock request to the standby coherency processing unit in response to a determination of a conflict between the responses received from the primary coherency processing unit and secondary coherency processing unit.

19. The method of claim 18, wherein the compensation lock request is a lock release request for releasing the first lock and the standby coherency processing unit releases the first lock in response to the compensation lock request.

20. The method of claim 16, wherein during failover the standby coherency processing unit grants the first lock request, in response to the first lock request issued by the first data processing host being a conflict with a lock state of a second data processing host, the lock state of the second data processing host stored on the standby coherency processing unit.

21. The method of claim 20, wherein the standby coherency processing unit downgrades a mode of the lock state of the second data processing host in response to the second data processing host being a failed host.

22. The method of claim 14, wherein the subset of locks stored in the standby coherency processing unit includes a write lock and does not include a read lock.

23. The method of claim 14, wherein the first current lock state information and the second lock state information further include:
    an identity of the data processing hosts corresponding to the locks stored therein, and
    a lock type for each of the locks stored therein.

24. A computer program product for managing shared resources, the computer program product comprising:
    a computer readable storage medium having computer readable program code embodied therewith, the computer readable program code comprising:
    computer readable program code configured to enable a computer to perform a method comprising:
    processing lock requests from a plurality of data processing hosts using a primary coherency processing unit and a standby coherency processing unit;
    storing a first current lock state information for the plurality of data processing hosts on the primary coherency processing unit;
    storing a second lock state information on the standby coherency processing unit, the second lock state information including a subset of locks included in the first current lock state information, the standby coherency processing unit configured to perform a plurality of activities of the primary coherency processing unit using the subset of locks in response to a failure of the primary coherency processing unit,
    wherein fewer locks are included in the first current lock state information compared to the second lock state information.

25. The computer program product of claim 24, wherein the primary coherency processing unit and the standby coherency processing unit receive the lock requests for processing from the plurality of data processing hosts in parallel.

26. The computer program product of claim 25, wherein the method further comprises transmitting a first and a second response to a first data processing host among the plurality of data processing hosts, the transmitting in response to a first lock request issued by the first data processing host for a first lock, wherein the first and second responses include one of a first lock grant and first lock denial, and are transmitted by the primary coherency processing unit and the standby coherency processing unit, respectively.

27. The computer program product of claim 24, wherein the subset of locks stored in the standby coherency processing unit includes a write lock and does not include a read lock.

28. The computer program product of claim 24, wherein the first current lock state information and the second lock state information further include:
    an identity of the data processing hosts corresponding to the locks stored therein, and
    a lock type for each of the locks stored therein.

* * * * *